US 6,269,628 B1

(12) United States Patent
Gates

(10) Patent No.: US 6,269,628 B1
(45) Date of Patent: Aug. 7, 2001

(54) APPARATUS FOR REDUCING COMBUSTOR EXIT DUCT COOLING

(75) Inventor: Roger Jonathan Gates, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/329,785

(22) Filed: Jun. 10, 1999

(51) Int. Cl.[7] ....................................................... F02C 3/06
(52) U.S. Cl. ............................................................ 60/39.36
(58) Field of Search ............................... 60/39.36, 752, 60/760, 39.32, 754; 415/115

(56) References Cited

U.S. PATENT DOCUMENTS

| | | |
|---|---|---|
| 3,652,181 | 3/1972 | Wilhelm, Jr. . |
| 3,691,766 * | 9/1972 | Champlon ........................... 60/39.82 |
| 3,761,205 | 9/1973 | Cronstedt . |
| 3,914,070 | 10/1975 | Straniti . |
| 4,195,476 * | 4/1980 | Wood ...................................... 60/737 |
| 4,439,982 * | 4/1984 | Weiler et al. ........................ 60/39.32 |
| 4,639,188 | 1/1987 | Swadley . |
| 4,955,192 | 9/1990 | Shekleton . |
| 5,271,220 | 12/1993 | Holmes et al. . |
| 5,280,703 | 1/1994 | Corrado et al. . |
| 5,387,081 | 2/1995 | LeBlanc . |
| 5,758,504 * | 6/1998 | Abreu et al. ............................ 60/754 |

* cited by examiner

Primary Examiner—Timothy S. Thorpe
Assistant Examiner—William Rodriguez
(74) Attorney, Agent, or Firm—Jeffrey W. Astle

(57) ABSTRACT

The present invention is directed to gas turbine engines in which distinct components are integrally cast so as to increase resistance to thermal stress and thus decrease the amount of cooling airflow required to maintain the structural integrity of the components. The inner duct wall of a reverse airflow duct is integrally cast with a circumferentially extending shroud surrounding the stator vanes forming the turbine nozzle. The integral casting permits the inner duct wall to withstand greater degrees of thermal stress and thus require less cooling.

7 Claims, 2 Drawing Sheets

APPARATUS FOR REDUCING COMBUSTOR EXIT DUCT COOLING

BACKGROUND OF THE INVENTION

1. Field of the Invention

The present invention relates to the field of turbine engines, and in particular, turbine engines in which distinct engine components are integrally cast so as to increase resistance to thermal stress, and thus decrease the need for cooling flow across the engine components.

2. Description of the Prior Art

Turbine engines, and in particular, gas turbine engines, are typically deployed in aircraft for jet propulsion. A gas turbine engine may form the core of a conventional turbojet engine, or may be used in conventional hybrid applications, such as in turboprop engines combining both jet and propeller propulsion.

A problem that occurs in gas turbine engines is that the components of the engine often cannot withstand prolonged and repeated exposure to the hot gases created during the combustion process. Engine components, such as combustion exit ducts, are typically formed of thin sheets of wrought metal which cannot withstand the prolonged, cyclic exposure to hot engine gases which are typically created during engine operation. As a result, these components require some mechanism for cooling in order to maintain their structural integrity over the service life of the engine.

In recent years, solutions have evolved for cooling engine combustion chamber components during operation of the engine. Proposed solutions are set forth in U.S. Pat. No. 5,271,220 to Holmes et al, issued Dec. 21, 1993, and U.S. Pat. No. 5,280,703 to Corrado et al, issued Jan. 25, 1994. These patents disclose radial inflow gas turbine engines in which the combustion chamber is surrounded by a case wall. Relatively cool airflow from the compressor stage of the engine is vented between the case wall and the outer wall of the combustion chamber to cool the combustion chamber walls during engine operation. The cooling airflow extends around the combustion chamber walls. The cooling airflow is ultimately vented into the combustion chamber where it is released in the exhaust stream.

A third construction is disclosed in U.S. Pat. No. 4,439,982 to Weller et al, issued Apr. 3, 1994. In this invention, airflow is directed around the combustion chamber during which time it is drawn on for use in the combustion process. The combustion products are then directed to a reverse flow duct where they flow across alternating rows of stator vanes and turbine blades. The airflow directed around the combustion chamber is vented through a duct into the interior of the stator vanes for cooling the stator vanes during engine operation. The airflow entering the interior of the stator vanes is then released into the exhaust stream through holes near the trailing edge of the stator vanes.

Both Holmes et al and Corrado et al relate to radial turbines and are not really pertinent. Each of the above-mentioned references provides for airflow which cools the walls of the combustion chamber and, in the case of Corrado et al, cools the turbine nozzle as well. The high volumes of cooling flow necessary to cool these components essentially deteriorates the efficiency of the engine. This occurs because a significant portion of the airflow being directed towards the combustion chamber by the compressor stage is not used by the combustion chamber. Instead, a significant portion of this airflow is used for transferring heat away from the combustion chamber and associated components. This means that more of the airflow from the compressor stages must be used for cooling and thus less of the airflow may be used for combustion.

SUMMARY OF THE INVENTION

Accordingly, it is an object of the invention to reduce the volume of cooling airflow which must be directed over thermally stressed components in a gas turbine engine.

It is another object of the invention to provide an apparatus which reduces the volume of cooling airflow required over thermally stressed engine components.

It is another object of the invention to provide a method of manufacturing engine components which are more resistant to thermal stress, thus reducing the amount of cooling airflow needed to maintain these components at their designed operating temperatures.

It is a further object of the invention to provide a method of reducing the relative diameter of the walls of the combustion chamber in a gas turbine engine.

In accordance with the above objects, the invention provides a gas turbine engine including a combustion chamber connected to a reverse airflow duct having a first duct wall portion. The combustion chamber is surrounded by an annular passage which provides airflow to the combustion chamber. The apparatus comprises an engine component which includes a plurality of airfoils for guiding airflow from the combustion chamber. The engine component includes an inner ring and an outer ring. The inner ring is connected to a static support. The outer ring includes a circumferentially extending shroud which is integrally cast with a second duct wall portion of the reverse airflow duct.

In accordance with the above objects, the invention provides a method of manufacturing an engine component for use in a gas turbine engine including a reverse airflow duct having a first duct portion. The engine component includes a plurality of airfoils extending circumferentially around a central hub, and defines an inner ring and an outer ring. The method comprises the step of integrally casting a second duct portion of the reverse airflow duct with a circumferentially extending shroud formed on the radial outward end of the engine component.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

The present invention relates to the principles of integrally casting distinct engine components so as to increase resistance to thermal stress and thus decrease requirements for cooling. The principles set forth in the present invention are described with respect to one particular application, but may be applied in other applications in gas turbine engines.

Figure 1:
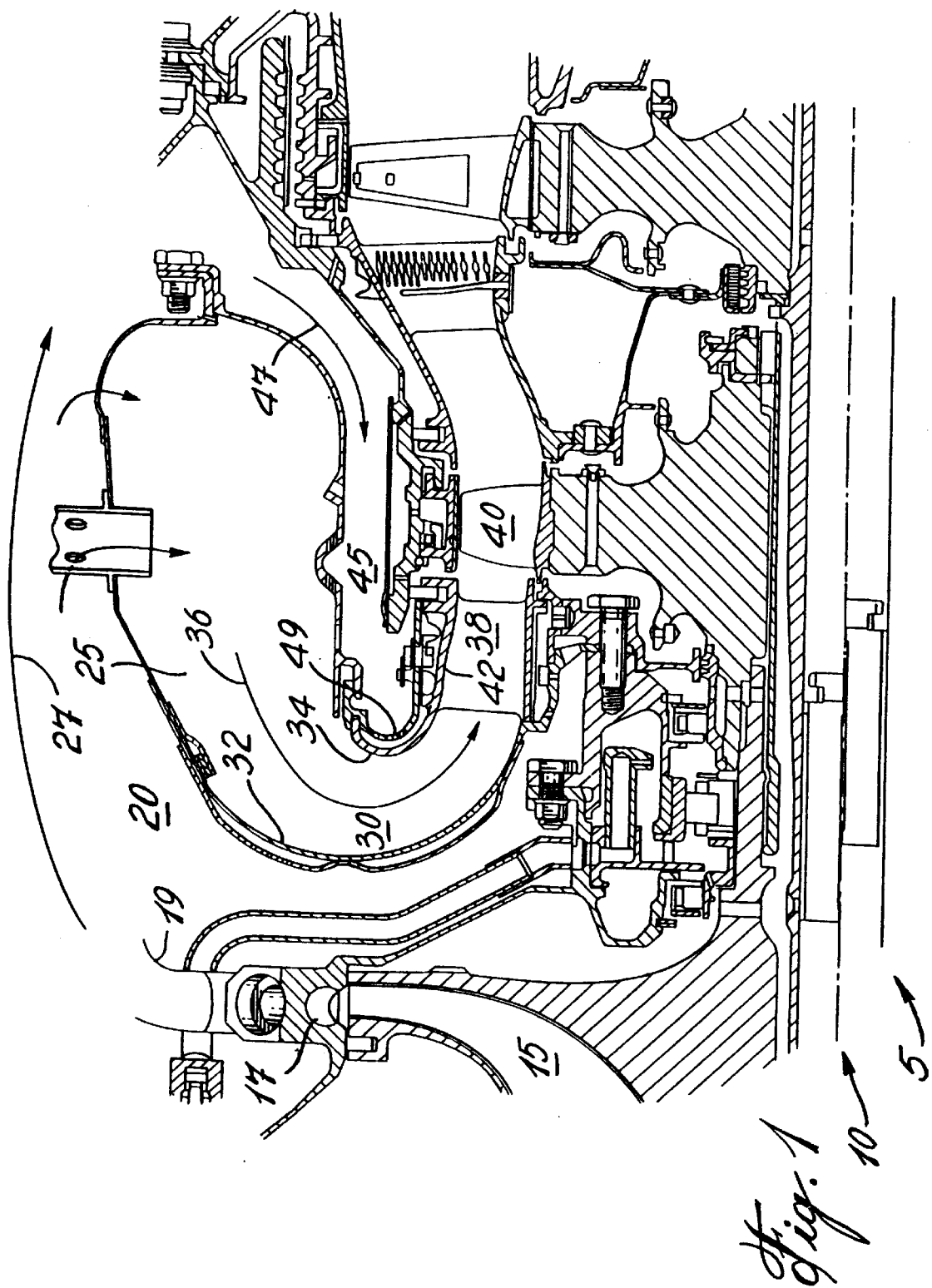
FIG. 1 illustrates a partial cross-sectional, axial view of the compressor and combustion sections of a gas turbine engine.

FIG. 1 illustrates the centrifugal impeller stage 15 of a compressor section, which directs flow radially outwardly to a diffuser 17. The airflow is then directed axially by diffuser pipes 19, which function to slow the airflow velocity and increase the pressure of the airflow in a manner well known in the art. High pressure airflow is thus directed into the annular passage 20 which surrounds the combustion chamber 25.

As seen in FIG. 1, the airflow within the annular passage 20 is directed around the combustion chamber 25, generally in the direction of the arrow 27. The combustion chamber 25 uses a major portion of this airflow in the combustion process. The high temperature, high pressure exhaust gases which are produced during the combustion process are then directed into the reverse airflow duct 30, which includes an outer duct wall 32 and an inner duct wall 34. The exhaust gases follow the flow path illustrated by the arrow 36, and flow across the stator vane blades 38 into the turbine stage which includes the turbine disc mounting blades 40.

Figure 2:
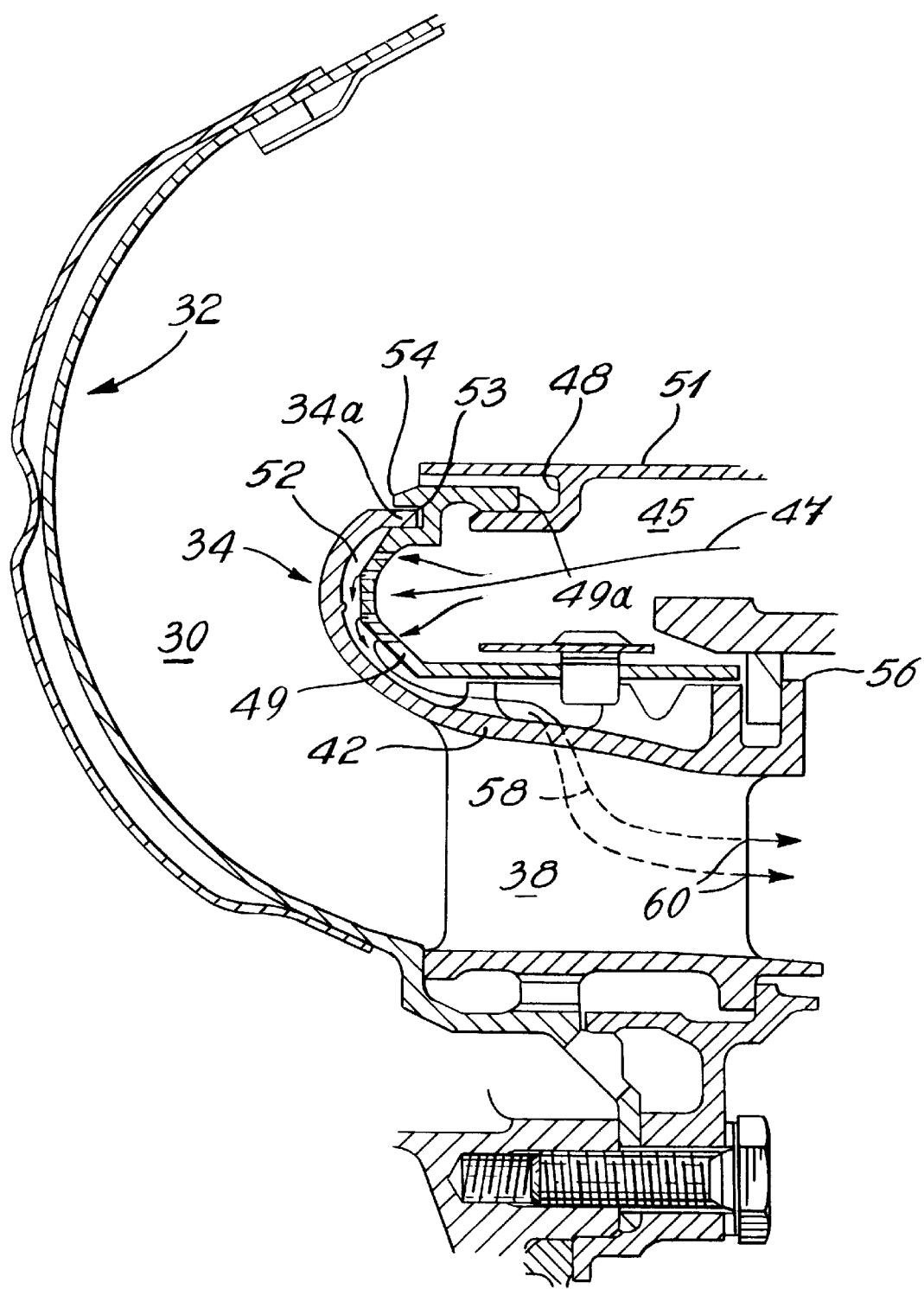
FIG. 2 illustrates an enlarged, partial cross-sectional view of an integral duct construction in accordance with the preferred embodiment of the present invention.

A portion of the airflow passing through the annular passage 20 to maintain the combustion process is also directed into the annular passage 45 along the flow path indicated by the arrow 47. This airflow then reaches the end wall 49 of the annular passage 45, where it is directed through small apertures in the end wall 49 and impinges on the inner surface of the inner duct wall 34, as best seen in FIG. 2. The airflow passing into the annular passage 45 is relatively cool, and thus serves to cool the inner duct wall 34 which is exposed to the exhaust gases produced during combustion. This serves to maintain the structural integrity of the inner duct wall during operation of the engine. The cooling airflow is then vented into the interior of the stator vanes 38 for purposes which will be described further with respect to FIG. 2.

In accordance with the preferred embodiments of the present invention, the inner duct wall 34 is formed as an integrally cast extension of a circumferentially extending shroud 42 formed on the radial outward end of the stator vane blades 38. The inner duct wall 34 and circumferentially extending shroud 42 are integrally cast as a unitary annular ring formed from a metal alloy which is highly resistant to thermal stress. Materials including nickel and cobalt may be incorporated in the metal alloy, although other metal alloys which are highly resistant to thermal stress are considered to be within the scope of the present invention.

The advantage of integrally casting the inner duct wall 34 with the circumferentially extending shroud 38 resides in the fact that such an integrally cast structure is far more resistant to thermal stress than conventional duct wall constructions formed from wrought sheet metal. This means that the integrally cast inner duct wall can withstand greater temperatures for longer periods of time than is possible when the duct wall is constructed from sheet metal. As a result, the duct wall 34 requires less cooling airflow from the annular passage 45 in order to maintain its structural integrity. This affords two major advantages. First, the engine can be designed with a smaller annular duct 45 since less airflow is required to cool the inner duct wall 34 and, therefore, the combustor may be constructed with a smaller diameter. This in turn permits weight reduction since less material is required to form the combustor as well as eventually a reduction in the overall size of the engine. Second, the decreased amount of cooling airflow required means that more of the airflow derived from the compressor section can be used for combustion, thus enhancing the efficiency of the engine.

FIG. 2 illustrates an enlarged cross-sectional view of an integral duct construction in accordance with the preferred embodiments of the present invention. The reverse airflow duct 30 is illustrated with the outer duct wall 32 and inner duct wall 34. As previously mentioned, the inner duct wall 34 is formed as an extension of the shroud 42 and provides the inner wall of the airflow duct 30. An annular, generally U-shaped, end wall 49 is mounted to the shroud support structure, as shown in FIG. 2, and includes a lip 49a which forms a seal with the annular slot 48 defined in the edge of the inner combustor wall 51. The end wall 49 is also provided with an annular groove or slot 53 which seals with the annular rim 34a formed on the outer edge of the inner duct wall 34.

The end wall 49 is also provided with openings which allow the cooling airflow to pass through into the impingement duct 52. The jets so formed and the resulting airflow through the impingement duct 52 will dissipate the heat from the end wall 34. The annular passage 45 is illustrated as delivering relatively cool airflow along the path of arrow 47. The airflow directed into the impingement duct 52 is guided towards the stator blades 38.

The path of the airflow through the impingement duct 52 and into the stator blades 38 is illustrated by the arrows 58. Each of the stator blades is generally hollow and includes a plurality of apertures 60 which release the cooling airflow into the exhaust stream. The apertures 60 are preferably arranged along the trailing edge of the blade, but the skilled artisan would readily recognize that these apertures may be arranged along any portion of the blade. As a result, the cooling airflow from the impingement duct 52 is directed within the stator vane airfoils and is released through the apertures 60.

I claim:

1. An apparatus for reducing the cooling requirements of a combustor exit duct in a gas turbine engine, the combustor including a combustion chamber defined by at least an outer annular wall and an inner annular wall, the combustion chamber communicating with a transition duct having a first duct portion having an outer duct wall and an inner duct wall, said combustion chamber being surrounded by an annular passage for providing cooling airflow to the inner and outer walls of said combustion chamber, an engine component downstream of said first duct portion and upstream of a turbine section, the engine component including a plurality of stator vanes for guiding gases through said gas turbine section with said engine component defining an inner ring and an outer ring;

said inner ring of said engine component being connected to a static support;

said outer ring of said engine component including a circumferentially extending shroud which is integrally cast with a portion of the inner duct wall of said first duct portion, the improvement including a second wall spaced from the inner duct wall and co-extensive therewith, the second wall being in the annular passage and including a plurality of openings therein to permit impingement cooling of the inner duct wall.

2. The apparatus as claimed in claim 1, wherein said circumferentially extending shroud and said inner duct wall define a unitary annular ring.

3. The apparatus as claimed in claim 2, wherein said annular ring has a cross-sectional configuration including a curvilinear portion and a generally linear wall portion coincident with the outward end of said engine component adjacent said curvilinear portion.

4. The apparatus as claimed in claim 3, wherein said annular ring is a one-piece cast element integral with the shroud and includes an outer annular rim, the combustor inner wall having an annular slot formed at the end thereof and having an axial component, and seal means extending between the rim of the annular ring and the slot formed in the combustor inner wall.

5. The apparatus as claimed in claim 4, wherein the second wall is in the shape of a second annular ring mounted to the shroud and is co-extensive and parallel to the annular ring forming the inner duct wall, the second annular ring being spaced from the annular ring to form an impingement duct, and a plurality of apertures extending through the second annular ring; the annular passage including an outer annular passage and an inner annular passage, whereby the inner annular passage is defined by the inner wall of the combustion chamber and by the second annular ring, and said apertures communicating the inner annular passage with the impingement duct so that cooling air can pass into the impingement duct and dissipate heat from the inner duct wall.

6. The apparatus as claimed in claim 5, wherein the second annular ring also forms said sealing means between the rim of the annular ring and the annular slot formed in the inner wall of the combustion chamber, and wherein the second annular ring includes a lip adapted to sealingly engage the annular slot of the inner annular wall of the combustion chamber and is also provided with a second annular slot for receiving the annular rim of the annular ring.

7. The apparatus as claimed in claim 5, wherein the impingement duct includes an outlet, between the first annular ring and the second annular ring, at the shroud of the engine component, wherein the vanes include internal cooling passages and inlets defined in the shroud for communicating with the outlet of the impingement duct.

* * * * *